Patented Dec. 22, 1931

1,837,266

UNITED STATES PATENT OFFICE

WINFRID HENTRICH AND MAX HARDTMANN, OF WIESDORF-ON-THE-RHINE, AND JOSEPH HILGER, OF COLOGNE-MULHEIM, GERMANY, ASSIGNORS TO GENERAL ANILINE WORKS, INC., OF NEW YORK, N. Y., A CORPORATION OF DELAWARE

COPPER COMPOUNDS OF SUBSTANTIVE AZO DYESTUFFS

No Drawing. Application filed April 14, 1927, Serial No. 183,897, and in Germany April 19, 1926.

The present invention relates to new copper-containing azo dyestuffs of the general formula:

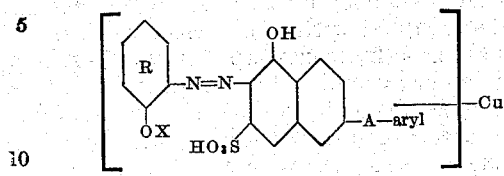

wherein X represents one of the groups alkyl, aryl and aralkyl, A represents one of the groups —NH— and —NH.CO.NH—, $n$ represents a whole number less than 3, and wherein the benzene nucleus R may be further substituted.

The new dyestuffs are obtainable for instance by causing a copper salt, such as copper sulfate or copper chloride, to act in a weakly acid solution upon an azo dyestuff of the general formula:

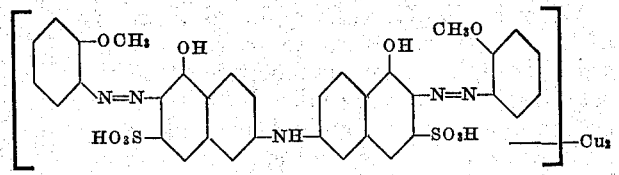

wherein X represents one of the groups alkyl, aryl and aralkyl, A represents one of the groups —NH— and —NH.CO.NH—, and wherein the benzene nucleus R may be further substituted.

Our new products which contain copper in complex form are generally dark powders soluble in a dilute solution of sodium carbonate and in concentrated sulfuric acid with a red to violet to blue coloration; they dye cotton generally from red to violet to blue shades, fast to light, alkali and ironing.

The invention is applicable within very wide limits and is illustrated by the following examples:

*Example 1.*—780 parts by weight of the azo dyestuff from 2 molecules of 2-aminoanisol and 1 molecule 5.5'-dihydroxy-2.2'-dinaphthylamino-7.7'-disulfonic acid are dissolved in 27000 volumes of water. The whole is rendered slightly acid with acetic acid whilst stirring and then at 80° C. 280 parts by weight of crystalline copper sulfate in 2800 parts of water are added. After heating for two hours at 70–80° C. the separation of the dyestuff acid is completed if necessary by the addition of common salt; the dyestuff is then filtered and dried. It corresponds most probably to the formula:

It dyes cotton from a Glauber-salt-sodium carbonate bath in reddish-violet shades, which are fast to alkali and to light and of good fastness to ironing.

The copper compound prepared in an analogous manner from the azo dyestuff from two molecules of 2.6-dimethoxy-1-aminobenzene and one molecule of 5.5'-dihydroxy-2.2'-dinaphthylamine-7.7'-disulfonic acid likewise dyes vegetable fibres in reddish violet shades.

The copper compound of the azo dyestuff from one molecule of 2-aminoanisol, one molecule of 4-chloro-2-aminoanisol and one molecule of 5.5'-dihydroxy-2.2'-dinaphthylamine-7.7'-disulfonic acid and likewise the copper compound of the azo dyestuff from two molecules of 4-chloro-2-aminoanisol and one molecule of 5.5'-dihydroxy-2.2'-dinaphthylamine-7.7'-disulfonic acid dye cotton, with the addition of Glauber salt and sodium carbonate to the dye-bath in violet shades, fast to alkali, possessing a considerably improved fastness to light over that of the direct dyeings of the starting material.

The corresponding azo dyestuffs containing copper from 5-hydroxy-5'-methoxy-2.2'-dinaphthylamine-7.7'-disulfonic acid (obtained by a partial methylation of 5.5'-dioxy-2.2'-dinaphthylamine-7.7'-disulfonic acid properties; grey water soluble powder; couples with diazotized p-sulfanilic acid to a considerably yellower red than the 5.5'-dihydroxy-2.2'-dinaphthylamine-7.7'-disulfonic acid) can be applied with good results. Thus for example the azo dyestuff containing copper from one molecule of 2-aminoanisol and one molecule of 5-hydroxy-5'-methoxy-2.2'-dinaphthylamine-7.7'-disulfonic acid dyes cotton in fast strong bluish red shades.

*Example 2.*—890 parts by weight of the azo dyestuff from two molecules of 4-nitro-2-aminoanisol and one molecule of 5.5'-dihydroxy-2.2'-dinaphthylamine-7.7'-disulfonic acid are dissolved in 27000 volumes of water. The whole is rendered distinctly acid to Congo red. While stirring at 50° C. a solution of 280 parts by weight of crystalline copper sulfate in 10 to 11 times the quantity of water is added and heating to 90° C. then takes place for some hours with stirring, after which the mineral acid is neutralized and the product filtered. The dyestuff containing copper can be redissolved in sodium carbonate solution, it is then salted out pressed and dried. It dyes cotton from a Glauber salt-sodium carbonate bath in bluish-violet shades, which are very fast to alkali and light.

When in the dyestuff employed above one of the two molecules of the 4-nitro-2-aminoanisol is replaced by one molecule of 2-chloroaniline, or one molecule of 3-nitraniline, or one molecule of 4-aminobenzamide, or 3-aminobenzoic or one molecule of 3-aminobenzaldehyde acid, or one molecule of 4-amino-3-methoxy-4'-hydroxyazobenzene 3'-carboxylic acid or one molecule of 2-aminonaphthalene-6-carboxylic acid, then according to the selection of the components, dyestuffs are obtained, which after the coppering yield valuable redder or bluer shades, which are fast to light and alkali.

*Example 3.*—517 parts by weight of the azo dyestuff from one molecule of 5-nitro-2-aminoanisol-4-sulfonic acid and one molecule of 2-phenylamino-5-hydroxynaphthalene-7-sulfonic acid are dissolved in 20000 volumes of hot water, the solution is rendered weakly acid to Congo red whilst stirring and a hot solution of 280 parts by weight of crystalline copper sulfate in 2800 parts of water is added. After heating for 2 hours at 80–90° C. the separation of the dyestuff acid is completed, if necessary, by the addition of common salt, when it is pressed and dried. It corresponds most probably to the formula:

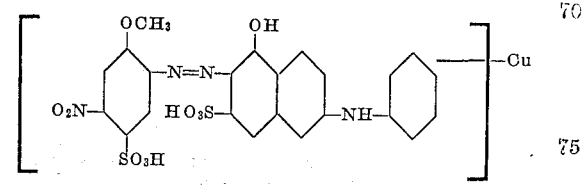

The dyestuff containing copper dyes cotton from a Glauber salt-sodium carbonate bath in violet shades, which are fast to light and alkali and of good fastness to ironing.

The copper compound prepared in a similar manner from the azo dyestuff from 5-nitro-2-aminoanisol-3-sulfonic acid and 4'-tolyl-2-amino-5-hydroxynaphthalene-7-sulfonic acid dyes the cotton in pure bluish violet shades of similar fastness properties.

When the 5-nitro-2-aminoanisol-3-sulfonic acid is replaced by the di-(2'-amino-1-methoxybenzene-4'-sulfonic acid)-1.4-phenylenediamine (coupled with two molecules of 4'-tolyl-2-amino-5-hydroxy-naphthalene-7-sulfonic acid) or by similar bis-compounds, dyestuffs are obtained the copper compounds of which dye cotton in fast reddish violet shades.

*Example 4.*—994 parts by weight of the azo dyestuff from two molecules of 2-aminophenolbenzylether and one molecule of 5.5'-dihydroxy-2.2'-dinaphthylurea-7.7'-disulfonic acid are dissolved in 25000 volumes of water, rendered distinctly acid with acetic acid, at 80° C. 200 parts by weight of crystalline copper chloride in 2000 parts of water are added and this temperature is maintained for 2 hours. The separated dyestuff acid is pressed and dried. The dyestuff dyes cotton from a Glauber salt-sodium carbonate bath in fast Bordeaux shades.

Instead of the above mentioned azo dyestuff similar success is likewise obtained by the application of the azo dyestuffs from other o-aminobenzylethers, as for example those from 2-aminophenolbenzylether-4-carboxylic acid (or 4-sulfonic acid) or from the compound.

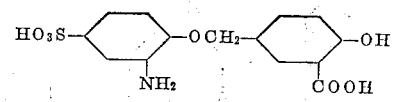

produced from 2-nitro-1-hydroxybenzene-4-sulfonic acid and chloromethylsalicylic acid according to German Patent No. 113,723, which in the form of the sodium salt is a practically colourless powder, soluble in water and subsequent conversion into the copper compounds.

The above mentioned o-aminobenzylether can be replaced by the o-aminophenolcyclohexylethers. The copper compounds of the substantive azo dyestuffs prepared from their diazo compounds dye cotton in remarkably pure shades.

Instead of 5-5'-dihydroxy-2.2'-dinaphthylurea-7.7'-disulfonic acid in the above example other suitable derivatives of 2-amino-5-hydroxynaphthalene-7-sulfonic acid can be used as for example 5-5'-dihydroxy-2.2'-dinaphthylamino-7.7'-disulfonic acid, 3'-aminophenyl - 1.2 - naphthimidazol - 5 - hydroxy-7-sulfonic acid or also 5'-5'''-dihydroxy-7'-7'''-disulfo-2'-2'''-dinaphthyl-1.4.-phenynylenediamine.

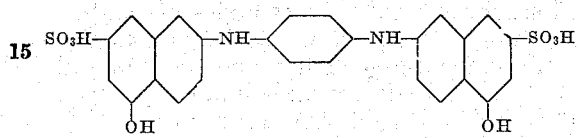

and similar compounds.

*Example 5.*—801 parts by weight of the azo dyestuff from two molecules of 2-aminophenetol and one molecule of 5.5'-dihydroxy-2.2'-dinaphthylamine-7.7' - disulfonic acid (sodium salt) are dissolved in 30000 volumes of hot water, the solution is rendered distinctly acid with formic acid, and aqueous solution of 350 parts by weight of crystalline copper sulfate is added and the whole is heated under pressure at 110° C. for 3 hours. The working up is effected in the customary manner. The new copper compound dyes cotton in fast reddish violet shades. The dyeing is very similar to that obtained from the dyestuff containing copper obtainable according to Example 1.

By using instead of the azo dyestuff containing copper mentioned, that from two molecules of 2-amino-1-ethoxybenzene-4-sulfamide and one molecule of 5.5'-dihydroxy-2.2'-dinaphthylamine-7.7'-disulfonic acid or that from one molecule of 2-aminoanisol, one molecule of 2-amino-1-ethoxybenzene-4-sulfanilide and one molecule of 5.5'-dihydroxy-2.2'-dinaphthylamine-7.7'-disulphonic acid, violet shades are obtained possessing the same fastness properties. The azo dyestuffs containing copper from two molecules of 2 - amino-1-isobutyloxy-4-sulfo-monomethylamide and one molecule of 5.5'-dihydroxy-2.2' - naphhylamine - 7.7' - disulfonic acid dyes cotton a reddish violet shade.

*Example 6.*—904 parts by weight of the dyestuff from one molecule of 2-aminoanisol, one molecule of 5.5'-dihydroxy-2.2'- dinaphthylurea-7.7'-disulfonic acid and one molecule of 2 - aminonaphthalene - 3 - carboxylic acid are dissolved in 35000 volumes of water, acidified with acetic acid at 80° C. 280 parts by weight of crystalline copper sulphate in 2800 parts of water are added. The separated dyestuff acid is heated to 70–80° C. for about one hour pressed and dried. The dyestuff dyes cotton from a Glauber salt-sodium carbonate bath in bluish red shades, which are fast to light, alkali and ironing.

Instead of the 2-aminoanisol, 2-aminophenetol or 2-aminophenetol-4-sulfomethylanilide or 3-amino-4-ethoxybenzoic acid can be employed. The 2-amino-naphthalene-3-carboxylic acid can be replaced by 1-aminobenzene-2-sulfonic acid or 2-carboxylic acid or their substitution products, whereby redder shades are obtained. The azo dyestuff from one molecule of 2-aminoanisol, one molecule of 2-aminobenzaldehyde and one molecule of 5.5'-dihydroxy-2.2'-dinaphthylamine-7.7'-disulfonic acid and subsequent treatment with hydroxylamine (see German application F. 57631), when applied in the form of its copper compound dyes cotton in clear and very fast bluish violet shades 5.5 - dihydroxy-2-2' - dinaphthylurea - 7.7'-disulfonic acid in the above example can also be replaced by other derivatives of 2-amino-5 - hydroxynaphthalene - 7 - sulphonic acid, thus for example, by the bisimidazol of the formula:

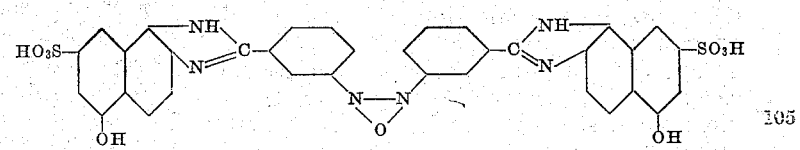

(see German Patent No. 248383) and similar compounds or also by the 5.5'-dihydroxy-2.2'-dinaphthylamine - 7.7' - disulfonic acid. Thus, for example, the copper compound of the azo dyestuff from two molecules of 3-amino-4-n-butyloxy-benz-n-butylamide and one molecule of 5.5'-dihydroxy-2.2'-dinaphthylamine-7.7'-disulfonic acid dyes vegetable fibres in fast violet shades.

*Example 7.*—909 parts by weight of the azo dyestuff from two molecules of 2-aminophenoxy-acetic acid and one molecule of 5.5'-dihydroxy-2.2'-dinaphthylamino-7.7' - disulfonic acid are dissolved in 20000 volumes of water, rendered distinctly acid with acetic acid and at 80° C. whilst stirring 300 parts by weight of crystalline copper sulfate in 3000 parts of water are added. After heating for 1 hour the separation of the dyestuff acid is completed if necessary, by the addition of common salt and the dyestuff is pressed and dried. It corresponds most probably to the formula:

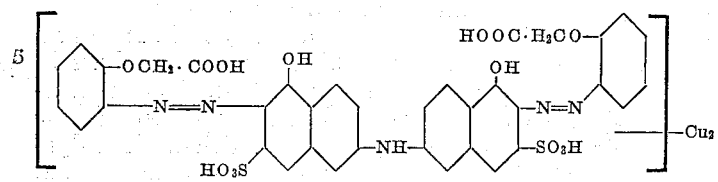

It dyes cotton from a Glauber salt-sodium carbonate bath in violet shades, which are fast to light.

The corresponding dyestuff from 5.5'-dihydroxy-2.2'-dinaphthylurea-7.7'-disulfonic acid yields a brownish red of similar properties. The analogous dyestuffs from β-(2-aminophenoxy)-propionic acid lead to similar and in some cases somewhat clearer shades.

*Example 8.*—833 parts by weight of the azo dyestuff from two molecules of 2-amino-1-hydroxybenzene-glycolether

and one molecule of 5.5'-dihydroxy-2.2'-dinaphthylamine-7.7'-disulfonic acid are dissolved in 26000 volumes of water, rendered distinctly acid with acetic acid and at 80° C. 250 parts by weight of crystalline copper sulfate are added. The whole is heated with stirring for 2 hours at 80° C. and the separation of the dyestuff acid is completed, if necessary, by the addition of common salt, after which the dyestuff is pressed and dried. It dyes cotton from a Glauber salt-sodium carbonate bath in particularly clear reddish violet shades, which are fast to light, alkali and ironing. It is a blackish powder soluble in a dilute solution of sodium carbonate with a bluish-red coloration, soluble in concentrated sulfuric acid with a violet-red coloration. It is broken up upon treatment with stannous chloride and hydrochloric acid into 2-amino-1-hydroxybenzeneglycolether 5-5'-dihydroxy-6.6'-diamino-2-2'-dinaphthylamine-7.7'-disulfonic acid and cuprous chloride.

The analogous dyestuff containing copper from 5.5'-dihydroxy-2.2'-dinaphthylurea-7.7.'-disulfonic acid produces distinctly redder shades.

Furthermore, valuable violet or red substantive dyestuffs are obtained, when the above glycolether is replaced by the corresponding glycerinether.

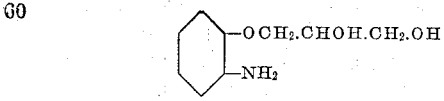

and when the substantive dyestuffs prepared therefrom in the customary manner are converted into the copper compounds according to the process of the above example.

Obviously o-aminophenylethers of polyvalent alcohols, which are substituted in the nucleus or side chain, can also be applied. Thus, for example, the azo dyestuff containing copper from two molecules of 4-nitro-2-amino-phenol-glycolether and one molecule of 5.5'-dihydroxy-2.2'-dinaphthylamino-7.7'-disulfonic acid dyes cotton in fast violet shades, similar to those of the analogous dyestuff containing copper obtained by the use of the 4-nitro-2-aminophenol-glycerinether.

Instead of the nitro-o-aminophenylethers of polyvalent alcohols the chloro-, or sulfo-, or otherwise substituted o-aminophenol-ethers of polyvalent alcohols, can be employed. The azo dyestuff containing copper from one molecule of the sulfuric acid ester of 3-amino-4-cresol-oxethylether

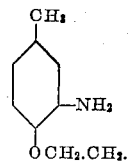

and one molecule of 4'-aminobenzoyl-2-amino-5-hydroxynaphthalene-7-sulfonic acid dyes cotton in red shades. The dyestuff can be diazotized on the fibre and developed with β-naphthol to a yellowish red shade, which is fast to light and washing.

The copper compounds of such substantive azo dyestuffs, as contain in the o-position to one azo group unsubstituted or substituted alkyloxy-, aralkyloxy- or aryloxy-groups and possessing a diazotizable amino group, can quite generally be further diazotized after the dyeing on the fibre and developed with the customary developers, as for example β-naphthol.

When the azo dyestuff utilized for the manufacture of the copper compound further contains a hydrogen atom in the o-position to a hydroxyl group, which hydrogen atom is capable of reacting with diazo compounds, the dyeing of the copper compound on vegetable fibres can be coupled with the customary diazo compounds, as for example that of p-nitraniline.

*Example 9.*—810 parts by weight of the dyestuff from one molecule of 1-aminobenzene-2.5-disulfonic acid and one molecule of aminohydroquinonedimethylether, further diazotized and coupled with one molecule of 2-phenylamino-5-hydroxynaphthalene-7-sulfonic acid are dissolved in 25000 volumes of water. The solution is rendered distinctly acid with acetic acid and at 80° C. 250 parts by weight of crystalline copper sulfate in 2500 parts of water are added. After heating for some two hours the dyestuff is pressed and dried It corresponds most probably to the formula:

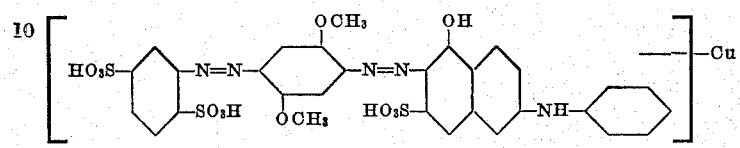

It dyes cotton from a Glauber salt-sodium carbonate bath in clear blue shades which are fast to light.

We claim:—

1. As new products the compounds of the general formula:

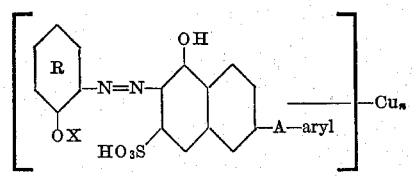

wherein X represents one of the groups alkyl, aryl and aralkyl, A represents one of the groups —NH— and —NH.CO.NH—, $n$ represents a whole number less than 3, and wherein the benzene nucleus R may be further substituted by a substituent of the group consisting of alkyl, alkoxy, halogen, the nitro group, the aldehydo group, the sulfonic acid group, the carboxylic acid group, the sulfonic acid amide group, and the carboxylic acid amide group.

2. As new products the compounds of the general formula:

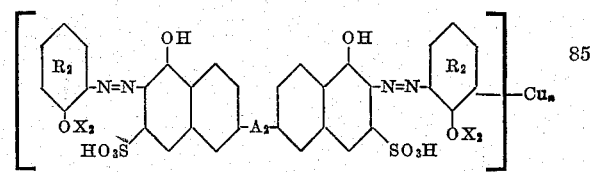

wherein $X_1$ represents one of the groups alkyl, aryl and aralkyl, $A_1$ represents one of the groups —NH—, —NH.CO.NH— and —NH.aryl.NH, $n$ represents a whole number less than 3 and $R'_1$ represents an aryl nucleus and wherein $R'_1$ and $R_1$ may be substituted by a substituent of the group consisting of alkyl, alkoxy, halogen, the nitro group, the aldehydo group, the sulfonic acid group, the carboxylic acid group, the sulfonic acid amide group, and the carboxylic acid amide group.

3. As new products the compounds of the general formula:

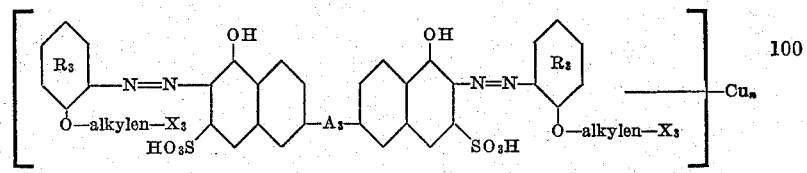

wherein $X_2$ represents one of the groups alkyl, aryl and aralkyl, $n$ represents a whole number less than 3, and $A_2$ represents one of the groups —NH—, —NH.CO.NH— and —NH.aryl.NH; and wherein the benzene nuclei $R_2$ may be further substituted.

4. As new products the compounds of the general formula:

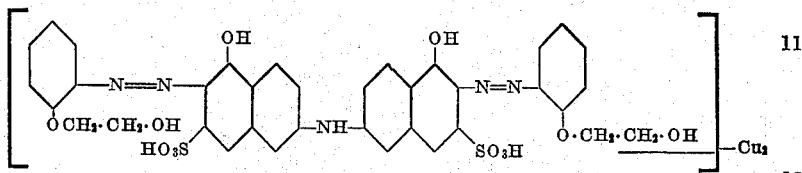

wherein $X_3$ represents hydroxyl or carboxyl, $A_3$ represents one of the groups —NH—, —NH.CO.NH— and NH.aryl.NH, $n$ represents a whole number less than 3, and wherein the benzene nuclei $R_3$ may be further substituted.

5. As a new product the compound of the probable formula:

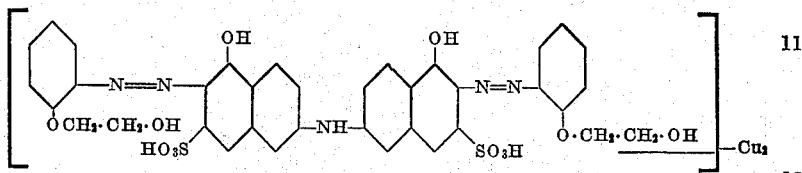

being a black powder, soluble in concentrated sulfuric acid with a violet-red coloration, dyeing cotton reddish-violet shades which are fast to light, alkali, and ironing.

In testimony whereof we have hereunto set our hands.

WINFRID HENTRICH.
MAX HARDTMANN.
JOSEPH HILGER.